United States Patent
Zou et al.

(10) Patent No.: US 11,392,226 B2
(45) Date of Patent: Jul. 19, 2022

(54) ACTIVE STYLUS CALIBRATION METHOD, ACTIVE STYLUS, AND ELECTRONIC DEVICE

(71) Applicant: Huawei Technologies Co., Ltd., Shenzhen (CN)

(72) Inventors: Yang Zou, Dongguan (CN); Junyong Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/431,391

(22) PCT Filed: Feb. 21, 2020

(86) PCT No.: PCT/CN2020/076098
§ 371 (c)(1),
(2) Date: Aug. 16, 2021

(87) PCT Pub. No.: WO2020/173390
PCT Pub. Date: Sep. 3, 2020

(65) Prior Publication Data
US 2022/0137729 A1    May 5, 2022

(30) Foreign Application Priority Data

Feb. 28, 2019    (CN) .......................... 201910153176.3

(51) Int. Cl.
*G06F 3/0354*    (2013.01)
*G06F 3/038*    (2013.01)
(Continued)

(52) U.S. Cl.
CPC .......... *G06F 3/03545* (2013.01); *G06F 3/038* (2013.01); *G06F 3/044* (2013.01); *G06F 3/04162* (2019.05); *H04W 4/80* (2018.02)

(58) Field of Classification Search
CPC .. G06F 3/03545; G06F 3/04162; G06F 3/038; G06F 3/044; H04W 4/80
See application file for complete search history.

(56) References Cited

U.S. PATENT DOCUMENTS 9,939,975 B2 * 4/2018 Ye ........................... G06F 3/044
10,514,803 B2 * 12/2019 Zyskind .............. G06F 3/04162
(Continued)

FOREIGN PATENT DOCUMENTS

| CN | 104571732 A | * | 4/2015 | ......... G06F 3/03545 |
| CN | 108205381 A | * | 6/2018 | ......... G06F 3/03545 |

(Continued)

*Primary Examiner* — Michael Pervan
(74) *Attorney, Agent, or Firm* — Conley Rose, P.C.

(57) ABSTRACT

An active stylus calibration method includes establishing, by an electronic device having a touchscreen, a network connection to an active stylus, detecting a function signal from the active stylus, determining a distance between the active stylus and the touchscreen based on a parameter value, obtained through detection, corresponding to the function signal, where a smaller parameter value indicates a larger distance, and when a timing is started when the distance is at a first threshold, the timing duration reaches a specified duration and the distance is at a second threshold, sending, through a network, a force calibration instruction to the active stylus to calibrate a force sensor based on the force calibration instruction.

20 Claims, 11 Drawing Sheets

(51) Int. Cl.
*H04W 4/80* (2018.01)
*G06F 3/044* (2006.01)
*G06F 3/041* (2006.01)

(56) References Cited

U.S. PATENT DOCUMENTS

2016/0239123 A1* 8/2016 Ye .................. G06F 3/03545
2017/0255328 A1* 9/2017 Zyskind ............ G06F 3/0383

FOREIGN PATENT DOCUMENTS

| CN | 108965583 A | * | 12/2018 | ........ H04M 1/72454 |
| CN | 110007784 A | * | 7/2019 | ......... G06F 3/03545 |
| WO | 2014188417 A2 | | 11/2014 | |
| WO | WO-2014188417 A2 | * | 11/2014 | ............... G01L 1/18 |
| WO | WO-2015055024 A1 | * | 4/2015 | ......... G06F 3/03545 |
| WO | WO-2020173390 A1 | * | 9/2020 | ......... G06F 3/03545 |

* cited by examiner

ACTIVE STYLUS CALIBRATION METHOD, ACTIVE STYLUS, AND ELECTRONIC DEVICE

CROSS-REFERENCE TO RELATED APPLICATIONS

This application is a U.S. National Stage of International Patent Application No. PCT/CN2020/076098 filed on Feb. 21, 2020, which claims priority to Chinese Patent Application No. 201910153176.3 filed on Feb. 28, 2019. Both of the aforementioned applications are incorporated herein by reference in their entireties.

TECHNICAL FIELD

This application relates to the field of terminal technologies, and in particular, to an active stylus calibration method, an active stylus, and an electronic device.

BACKGROUND

With development of touch control technologies, more mobile terminals perform human-computer interaction in a touch control manner. In addition to being operated through touch by using a finger, a touchscreen of the mobile terminal may alternatively be operated through touch by using a stylus.

Styluses include a passive stylus and an active stylus. A function of the passive stylus is equivalent to a function of a finger of a person. When the passive stylus is in contact with the touchscreen, a small part of current flows from the touchscreen to the passive stylus through a touch point. This is equivalent to a change of an electrode capacitance at the touch point, and a control chip of the touchscreen may determine a position of the touch point by detecting the change of the electrode capacitance. A tip of the passive stylus is usually designed to be relatively large. As a type of the active stylus, an active capacitive stylus may transmit a voltage drive signal to change an electric field at a touch point, so as to change an electrode capacitance at the touch point. The control chip of the touchscreen may determine a position of the touch point by detecting a change of the electrode capacitance. A tip of the active stylus may be designed to be relatively small.

To achieve a natural writing effect, a force sensor is usually added to the tip of the active stylus. In this way, different tilts under different force may be implemented to simulate real handwriting of persons. A conventional force sensor may deform under an external force, causing force inaccuracy. This usually causes a problem of a false report point (or commonly referred to as "water leakage") generated between the active stylus and the touchscreen. Consequently, the force sensor needs to be calibrated in real time.

An existing force calibration method for the active stylus is usually as follows: When a user does not write, the force sensor detects that nib force basically remains unchanged. In this case, calibration is started. The calibration means that a current force value is used as a reference value, and a report point is generated on the touchscreen only when the force is greater than the reference value. However, when the active stylus is used for writing under fixed force, based on the foregoing determining condition, it is considered by mistake that a force value of the force sensor remains unchanged, and miscalibration occurs. As a result, if force subsequently exerted by the user on the stylus is less than the reference value, no report point can be generated between the active stylus and the touchscreen (or commonly referred to as "no water out").

SUMMARY

This application provides an active stylus calibration method, an active stylus, and an electronic device, to resolve a problem of miscalibration of the active stylus.

According to a first aspect, an embodiment of this application provides an active stylus calibration method. The method is applied to an electronic device having a touchscreen, and the method includes: The electronic device establishes a network connection to an active stylus, the active stylus transmits a function signal to the electronic device, and the electronic device determines a distance between the active stylus and the touchscreen of the electronic device based on a parameter value, obtained through detection, corresponding to the function signal. If timing is started when the distance is a first threshold, when timing duration reaches specified duration and the distance is a second threshold, a force calibration instruction is sent to the active stylus through a network, and the active stylus calibrates a force sensor based on the force calibration instruction.

In this embodiment of this application, when the active stylus is under fixed force, the distance between the active stylus and the touchscreen of the electronic device is always the first threshold, and therefore, miscalibration does not occur. In addition, when writing is finished, in a period from a time when a user starts to lift the stylus to a time when the user completely moves the stylus away from the screen, the active stylus calibrates the force sensor when determining that the distance reaches the second threshold and deformation restoration duration of the force sensor is already exceeded, so that miscalibration does not occur, and due to timely calibration, a false report point is not generated on the touchscreen in a process of lifting the stylus by the user.

In a possible design, the electronic device and the active stylus may be connected in a short distance based on a communications network such as Wi-Fi hotspot, Wi-Fi direct connection, Bluetooth, zigbee, or NFC.

In a possible design, when the active stylus is an active capacitive stylus, the function signal is a voltage drive signal, the touchscreen of the electronic device receives the voltage drive signal, and the parameter value, detected by the electronic device, corresponding to the function signal is a capacitance value; or when the active stylus is an active electromagnetic stylus, the function signal is an electromagnetic drive signal, and the parameter value, detected by the electronic device, corresponding to the function signal is a magnetic flux.

According to a second aspect, an embodiment of this application provides an active stylus calibration method. The method is applied to an active stylus, and the method includes: The active stylus establishes a network connection to an electronic device, transmits a function signal to the electronic device, then receives a force calibration instruction sent by the electronic device, and calibrates a force sensor based on the force calibration instruction.

The force calibration instruction is generated by the electronic device when the electronic device determines that a parameter value, obtained through detection, corresponding to the function signal meets a specified condition, where the specified condition includes: timing is started when a distance is a first threshold, timing duration reaches specified duration and the distance is a second threshold; the distance is determined by the electronic device based on the parameter value, where a smaller parameter value indicates a larger distance; the second threshold is greater than the first threshold; and the specified duration is related to a deformation restoration period of the force sensor of the active stylus.

According to a third aspect, an embodiment of this application provides an active stylus calibration method. The method is applied to an electronic device having a touchscreen, and the method includes: The electronic device establishes a network connection to an active stylus, the active stylus transmits a function signal to the electronic device, and the electronic device sends, through the network connection, a parameter value, obtained through detection, corresponding to the function signal to the active stylus, so that the active stylus calibrates a force sensor when determining that the parameter value, obtained through detection, corresponding to the function signal meets a specified condition, where the specified condition includes: timing is started when a distance is a first threshold, timing duration reaches specified duration and the distance is a second threshold.

The distance is determined by the active stylus based on the parameter value, where a smaller parameter value indicates a larger distance; the second threshold is greater than the first threshold; and the specified duration is related to a deformation restoration period of the force sensor of the active stylus.

According to a fourth aspect, an embodiment of this application provides an active stylus calibration method. The method is applied to an active stylus, and the method includes: The active stylus establishes a network connection to an electronic device, sends a function signal to the electronic device, then receives, through the network connection, a parameter value, sent by the electronic device, corresponding to the function signal, and calibrates a force sensor when determining that the parameter value meets a specified condition, where the specified condition includes: timing is started when a distance is a first threshold, timing duration reaches specified duration and the distance is a second threshold.

The distance is determined by the active stylus based on the parameter value, where a smaller parameter value indicates a larger distance; the second threshold is greater than the first threshold; and the specified duration is related to a deformation restoration period of the force sensor of the active stylus.

According to a fifth aspect, an embodiment of this application provides an electronic device. The electronic device includes a touchscreen, a transceiver, a processor, and a memory. The memory is configured to store one or more computer programs. When the one or more computer programs stored in the memory are executed by the processor, the electronic device is enabled to implement the method according to any one of the possible designs of the first aspect and the possible designs of the third aspect.

According to a sixth aspect, an embodiment of this application further provides an apparatus. The apparatus includes modules/units that perform the method according to any possible design of any one of the foregoing aspects. These modules/units may be implemented by hardware, or may be implemented by hardware executing corresponding software.

According to a seventh aspect, an embodiment of this application provides an active stylus. The active stylus includes an active stylus body, and a force sensor, a microprocessor, a transceiver, and a memory that are disposed on the active stylus body. When one or more computer programs stored in the memory are executed by the microprocessor, the active stylus is enabled to implement the method according to any one of the possible designs of the second aspect and the possible designs of the fourth aspect.

According to an eighth aspect, an embodiment of this application further provides an apparatus. The apparatus includes modules/units that perform the method according to any possible design of any one of the foregoing aspects. These modules/units may be implemented by hardware, or may be implemented by hardware executing corresponding software.

According to a ninth aspect, an embodiment of this application further provides a computer-readable storage medium. The computer-readable storage medium includes a computer program, and when the computer program is run on an electronic device, the electronic device or the active stylus is enabled to perform the method according to any possible design of any one of the foregoing aspects.

According to a tenth aspect, an embodiment of this application further provides a computer program product. When the computer program product is run on a terminal, the electronic device or the active stylus is enabled to perform the method according to any possible design of any one of the foregoing aspects.

These aspects or other aspects in this application are clearer and more intelligible in descriptions of the following embodiments.

DESCRIPTION OF EMBODIMENTS

The following describes technical solutions in embodiments of this application with reference to the accompanying drawings in the embodiments of this application. In the descriptions of the embodiments of this application, the following terms "first" and "second" are merely used for a purpose of description, and shall not be understood as an indication or implication of relative importance or an implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

Figure 1:
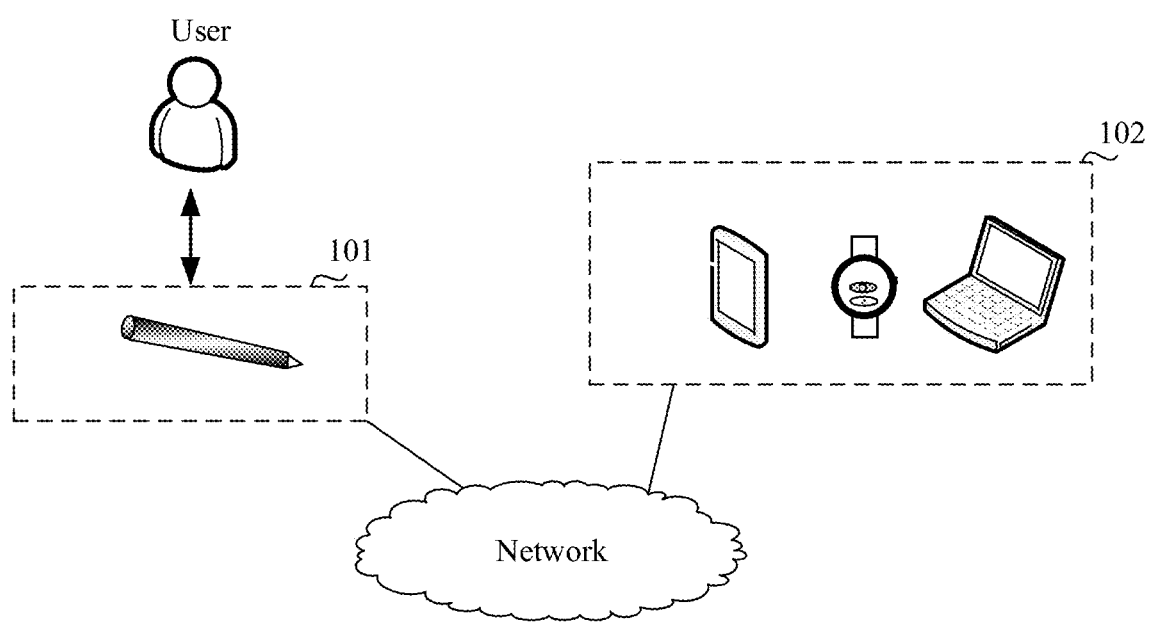
FIG. 1 is a schematic diagram of an interconnection scenario according to an embodiment of this application.

The active stylus calibration methods provided in the embodiments of this application may be applied to a scenario, shown in FIG. 1, in which an active stylus 101 and an electronic device 102 are interconnected based on a communications network. The active stylus 101 first establishes a network connection to the electronic device 102 through the network. When operating the electronic device 102, the active stylus 101 transmits a function signal to the electronic device 102. The electronic device 102 may determine a distance between the active stylus 101 and the electronic device 102 based on a parameter value, obtained through detection, corresponding to the function signal, and further sends, when the distance meets a specified condition, a force calibration instruction to the active stylus 101 through the network. The active stylus 101 calibrates a force sensor based on the force calibration instruction.

For example, the communications network may be a short-distance communications network such as a Wi-Fi hotspot network, a Wi-Fi P2P network, a Bluetooth network, a zigbee network, or a near field communication (near field communication, NFC) network.

It should be noted that in some embodiments of this application, the active stylus 101 shown in FIG. 1 may be an active capacitive stylus, or may be an active electromagnetic stylus; and the electronic device 102 shown in FIG. 1 may be a portable electronic device that further includes another function such as a personal digital assistant function and/or a music player function, such as a mobile phone, a tablet computer, or a wearable device (for example, a smart watch) having a wireless communication function. An example embodiment of the portable electronic device includes but is not limited to a portable electronic device using iOS®, Android®, Microsoft®, or another operating system. The portable electronic device may alternatively be another portable electronic device, for example, a laptop computer (laptop) with a touch-sensitive surface (for example, a touch panel). It should be further understood that, in some other embodiments of this application, the electronic device 102 may alternatively be a desktop computer with a touch-sensitive surface (for example, a touch panel), but not the portable electronic device.

Figure 2:
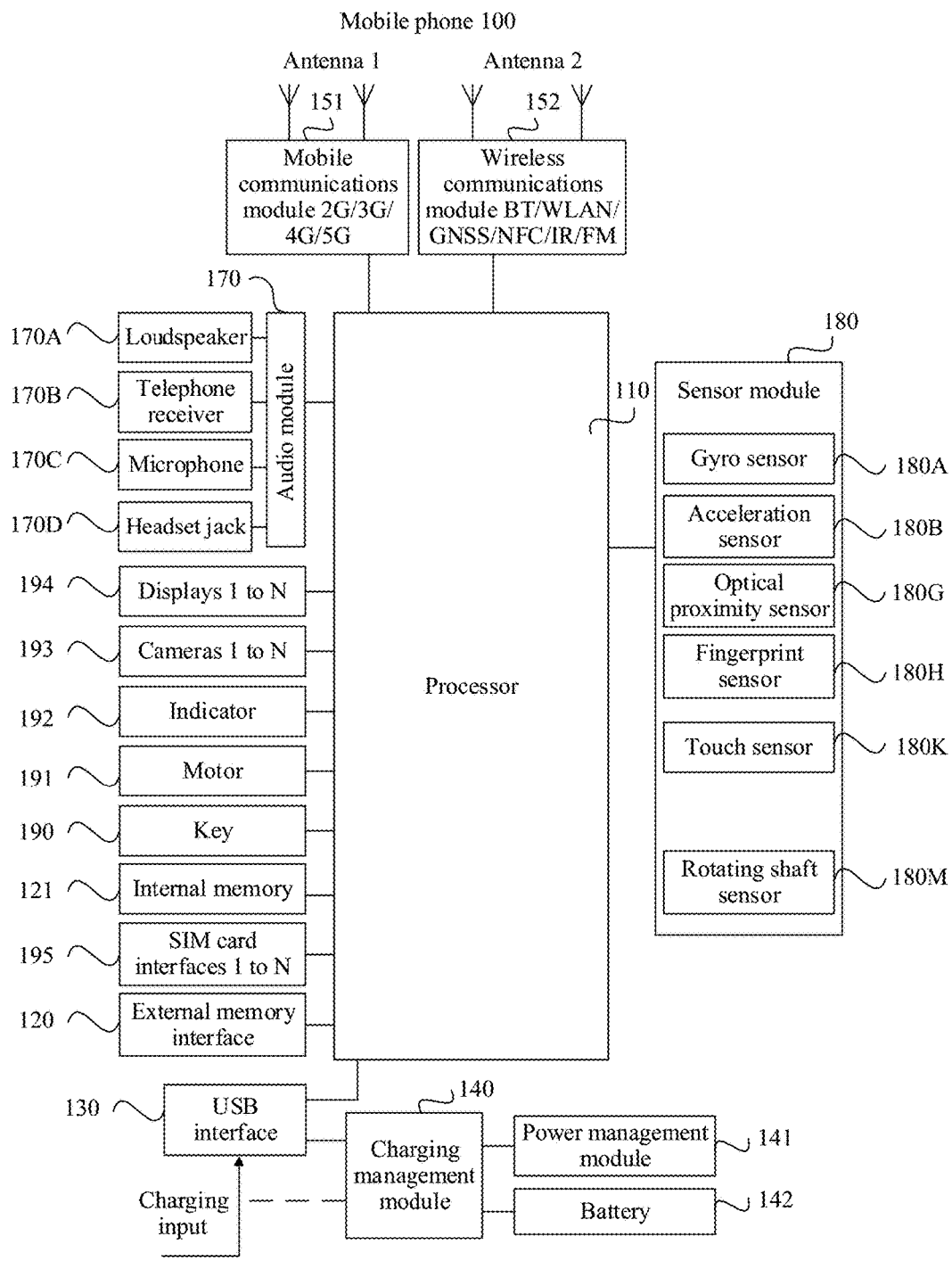
FIG. 2 is a schematic structural diagram of a mobile phone according to an embodiment of this application.

For example, the electronic device 102 is a mobile phone, and FIG. 2 is a schematic structural diagram of the mobile phone.

The mobile phone may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a SIM card interface 195, and the like. The sensor module 180 may include a gyro sensor 180A, an acceleration sensor 180B, an optical proximity sensor 180G, a fingerprint sensor 180H, a touch sensor 180K, and a rotating shaft sensor 180M (where certainly, the mobile phone 100 may alternatively include another sensor such as a temperature sensor, a force sensor, a distance sensor, a magnetic sensor, an ambient light sensor, a barometric force sensor, or a bone conduction sensor, which is not shown in the figure).

It may be understood that an illustrated structure in the embodiments of the present invention does not constitute a specific limitation on the mobile phone 100. In some other embodiments of this application, the mobile phone 100 may include more or fewer parts than those shown in the figure, or combine some parts, or divide some parts, or have different part arrangements. The parts in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the mobile phone 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting period of the processor 110. Therefore, system efficiency is improved.

The processor 110 may run the active stylus calibration methods provided in the embodiments of this application, to resolve problems of miscalibration and water leakage of an active stylus. When different components are integrated into the processor 110, for example, a CPU and a GPU are integrated, the CPU and the GPU may cooperate to perform the active stylus calibration methods provided in the embodiments of this application. For example, in the methods, some algorithms are performed by the CPU, and the other algorithms are performed by the GPU, to obtain relatively fast processing efficiency.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a miniLED, a microLED, a micro-OLED, a quantum dot light-emitting diode (quantum dot light emitting diodes, QLED), or the like. In some embodiments, the mobile phone 100 may include one or N displays 194. N is a positive integer greater than 1.

In the embodiments of this application, in one case, as a type of the active stylus, an active capacitive stylus may transmit a voltage drive signal to change an electric field at a touch point, so as to change an electrode capacitance at the touch point. A control chip of the display may determine a position of the touch point by detecting a change of the electrode capacitance. In another case, as a type of the active stylus, an active electromagnetic stylus transmits an electromagnetic drive signal, and interacts with an electromagnetic induction panel that is behind the display. When the active electromagnetic stylus approaches the display, an induction line under the electromagnetic induction panel that is behind the display changes, and a control chip of the display receives signals based on antenna arrays in the horizontal direction and the vertical direction, and obtains, through calculation, a coordinate position of the stylus based on a change of a magnetic flux.

The camera 193 (a front camera or a rear camera) is configured to capture a static image or a video. Usually, the camera 193 may include a photosensitive element such as a lens group and an image sensor. The lens group includes a plurality of lenses (a convex lens or a concave lens), and is configured to: collect an optical signal reflected by a to-be-photographed object, and transfer the collected optical signal to the image sensor. The image sensor generates an original image of the to-be-photographed object based on the optical signal.

The internal memory 121 may be configured to store computer-executable program code, and the executable program code includes an instruction. The processor 110 runs the instruction stored in the internal memory 121, to implement various function applications and data processing of the mobile phone 100. The internal memory 121 may include a program storage area and a data storage area. The program storage area may store code of an operating system, an application program (for example, a camera application or a WeChat application), or the like. The data storage area may store data (for example, an image or a video collected by the camera application) created during use of the mobile phone 100 or the like.

The internal memory 121 may alternatively store code of an anti-accidental touch algorithm provided in the embodiments of this application. When the code, stored in the internal memory 121, of the anti-accidental touch algorithm is run by the processor 110, a touch operation in a folding or unfolding process may be shielded.

In addition, the internal memory 121 may include a high-speed random access memory, and may further include a nonvolatile memory, for example, at least one magnetic disk storage device, a flash memory device, or a universal flash storage (universal flash storage, UFS).

Certainly, the code, provided in the embodiments of this application, of the anti-accidental touch algorithm may alternatively be stored in an external memory. In this case, the processor 110 may run, by using the external memory interface 120, the code, stored in the external memory, of the anti-accidental touch algorithm, to shield a touch operation in a folding or unfolding process.

The following describes a function of the sensor module 180.

The gyro sensor 180A may be configured to determine a motion posture of the mobile phone 100. In some embodiments, an angular velocity of the electronic device 100 separately around three axes (namely, an x axis, a y axis, and a z axis) may be determined by using the gyro sensor 180A. In other words, the gyro sensor 180A may be configured to detect a current motion status of the mobile phone 100, for example, whether the mobile phone 100 is in a shaken or static state.

The acceleration sensor 180B may detect values of accelerations in various directions (usually in directions of the three axes) of the mobile phone 100. In other words, the gyro sensor 180A may be configured to detect a current motion status of the mobile phone 100, for example, whether the mobile phone 100 is in a shaken or static state. The optical proximity sensor 180G may include, for example, a light emitting diode (LED) and an optical detector such as a photodiode. The light emitting diode may be an infrared light emitting diode. The mobile phone transmits infrared light outward by using the light emitting diode. The mobile phone detects infrared reflected light from a nearby object by using the photodiode. When sufficient reflected light is detected, it may be determined that there is an object near the mobile phone. When insufficient reflected light is detected, the mobile phone may determine that there is no object near the mobile phone.

The gyro sensor 180A (or the acceleration sensor 180B) may send, to the processor 110, motion status information (for example, the angular velocity) obtained through detection. The processor 110 determines, based on the motion status information, whether the mobile phone is currently in a handheld state or a tripod state (where for example, when the angular velocity is not 0, it indicates that the mobile phone 100 is in the handheld state).

The fingerprint sensor 180H is configured to collect a fingerprint. The mobile phone 100 may use a feature of the collected fingerprint to implement fingerprint unlocking, application access locking, fingerprint photographing, fingerprint call answering, and the like.

The touch sensor 180K is also referred to as a "touch panel". The touch sensor 180K may be disposed in the display 194, and the touch sensor 180K and the display 194 constitute a touchscreen, which is also referred to as a "touch control screen". The touch sensor 180K is configured to detect a touch operation on or near the touch sensor 180K. The touch sensor may transfer the detected touch operation to an application processor, to determine a type of a touch event. Visual output related to the touch operation may be provided by using the display 194. In some other embodiments, the touch sensor 180K may alternatively be disposed on a surface of the mobile phone 100 at a position different from a position of the display 194.

For example, the display 194 of the mobile phone 100 displays a home screen, and the home screen includes icons of a plurality of applications (for example, a camera application and a WeChat application). A user taps an icon of the camera application on the home screen by using the touch sensor 180K, to trigger the processor 110 to start the camera application and open the camera 193. The display 194 displays a screen of the camera application, for example, a viewfinder screen.

A wireless communication function of the mobile phone 100 may be implemented by using the antenna 1, the antenna 2, the mobile communications module 151, the wireless communications module 152, the modem processor, the baseband processor, and the like.

The antenna 1 and the antenna 2 are configured to transmit and receive an electromagnetic wave signal. Each antenna in the terminal device 100 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 151 can provide a solution, applied to the terminal device 100, for wireless communication including 2G/3G/4G/5G and the like. The mobile communications module 151 may include at least one filter, a switch, a power amplifier, a low noise amplifier (low noise amplifier, LNA), and the like. The mobile communications module 151 may receive an electromagnetic wave by using the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 151 may be disposed in the processor 110. In some embodiments, at least some function modules in the mobile communications module 151 may be disposed in a same component as at least some modules in the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then the demodulator transfers the low-frequency baseband signal obtained through demodulation to the baseband processor for processing. The low-frequency baseband signal is processed by the baseband processor and is transferred to the application processor. The application processor outputs a sound signal by using an audio device (which is not limited to the speaker 170A, the telephone receiver 170B, or the like), or displays an image or a video by using the display 194. In some embodiments, the modem processor may be an independent component. In some other embodiments, the modem processor may be independent of the processor 110, and is disposed in a same device with the mobile communications module 150 or another function module.

The wireless communications module 152 may provide a solution, applied to the terminal device 100, for wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field wireless communication (near field communication, NFC) technology, an infrared (infrared, IR) technology, or the like. The wireless communications module 152 may be one or more components integrating at least one communications processing module. The wireless communications module 152 receives an electromagnetic wave by using the antenna 2, performs frequency modulation and filtering processing on an electromagnetic wave signal, and sends a signal obtained after processing to the processor 110. The wireless communications module 152 may further receive a to-be-sent signal from the processor 110, perform frequency modulation on and amplify the signal, and convert the signal into an electromagnetic wave for radiation by using the antenna 2.

In addition, the mobile phone 100 may implement an audio function by using the audio module 170, the speaker 170A, the telephone receiver 170B, the microphone 170C, the headset jack 170D, the application processor, and the like. For example, the function may be music playing and recording. The mobile phone 100 may receive an input from the key 190, and generate a key signal input related to a user setting and function control of the mobile phone 100. The mobile phone 100 may generate a vibration prompt (for example, an incoming call vibration prompt) by using the motor 191. The indicator 192 in the mobile phone 100 may be an indicator light, may be configured to indicate a charging state and a power change, and may also be configured to indicate a message, a missed call, a notification, and the like. The SIM card interface 195 in the mobile phone 100 is configured to connect to a SIM card. The SIM card may be inserted into the SIM card interface 195 or plugged from the SIM card interface 195, to implement contact with or separation from the mobile phone 100.

It should be understood that during actual application, the mobile phone 100 may include more or fewer parts than those shown in FIG. 1. This is not limited in this embodiment of this application.

Figure 3:
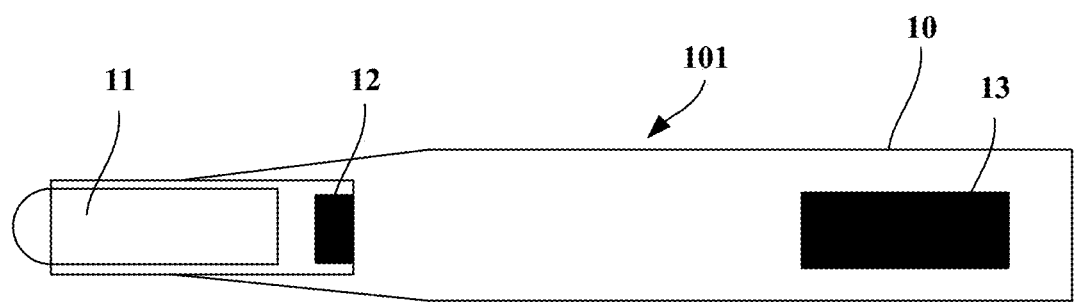
FIG. 3 and FIG. 4 are schematic diagrams of an assembly structure of an active stylus according to an embodiment of this application.
Figure 4:
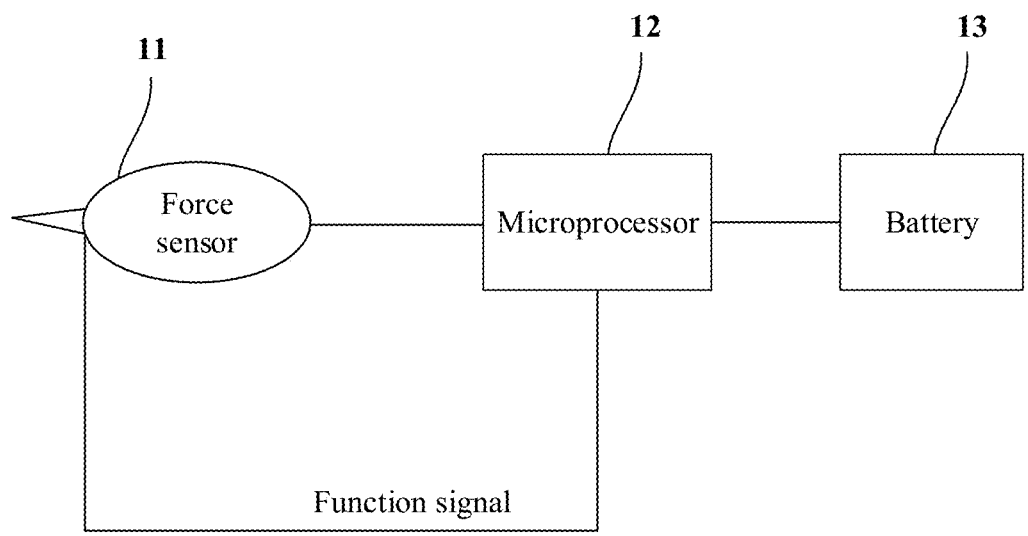

As shown in FIG. 3 and FIG. 4, an embodiment of the present invention further provides a schematic structural diagram of an active stylus 101 used in cooperation with the touchscreen in FIG. 2. The active stylus 101 includes a stylus shell 10, a stylus core 11, a microprocessor 12, and a battery 13.

The stylus core 11 has a force sensor, and the force sensor deforms when the force sensor is under force.

The microprocessor 12 is connected to the stylus core 11, and is configured to: generate a function signal, and send the function signal to a display 194 of an electronic device 102 by using the stylus core 11.

When the active stylus 101 is an active capacitive stylus, the function signal is a voltage drive signal. When the active stylus 101 is an active voltage stylus, the function signal is an electromagnetic drive signal.

The battery 13 is configured to provide power supply for the microprocessor 12, and a rechargeable lithium battery may be used to provide the power supply.

All the following embodiments may be implemented on the active stylus 101 and the electronic device 102 that have the foregoing hardware structures.

Figure 5A:
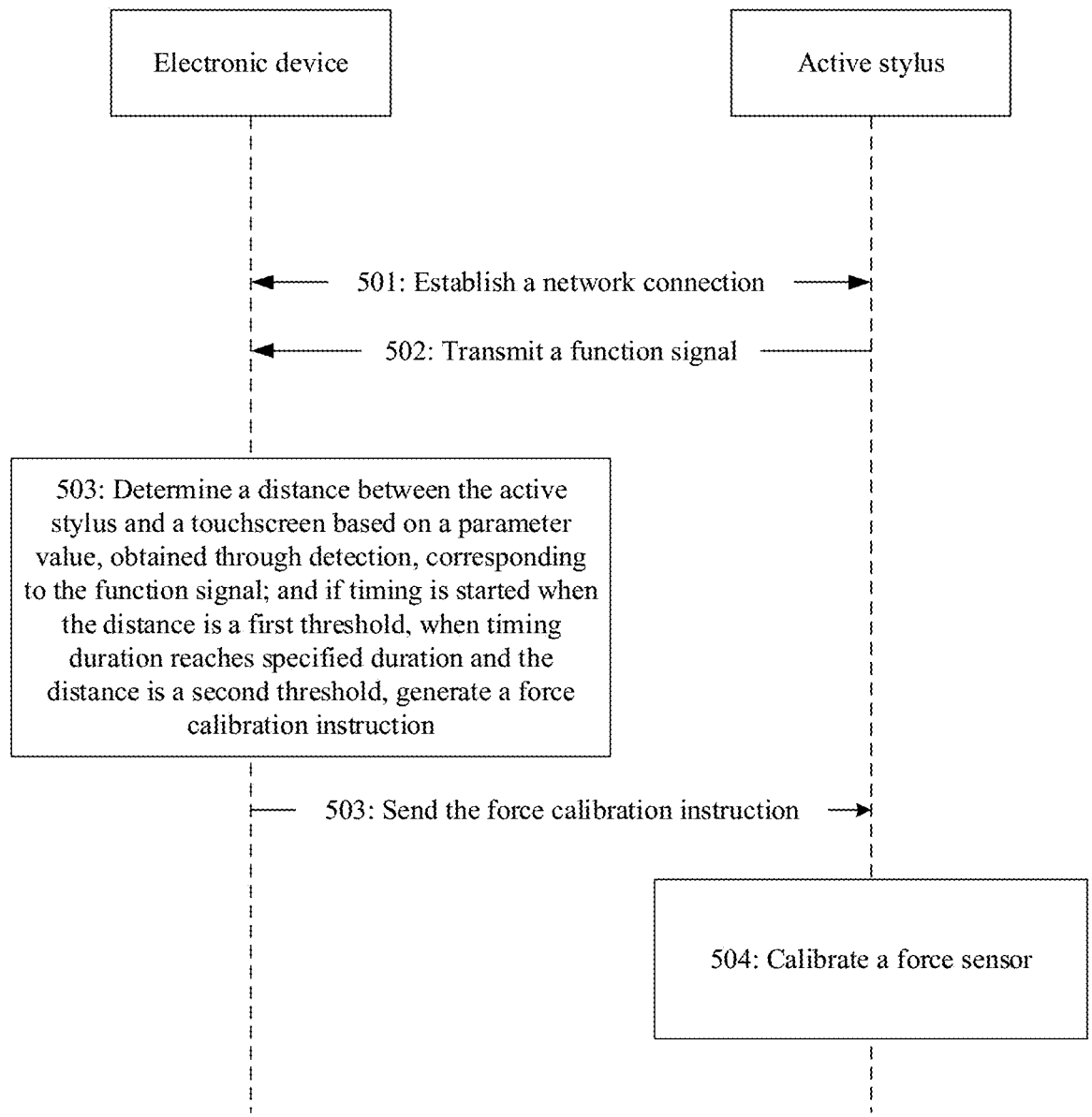
FIG. 5a is a schematic flowchart of an active stylus calibration method according to an embodiment of this application.

An embodiment of this application provides an active stylus calibration method. The method can implement calibration of an active stylus 10 by an electronic device 102. As shown in FIG. 5a, the method includes the following steps.

501: The electronic device 102 establishes a network connection to the active stylus 101.

For example, the electronic device 102 and the active stylus 101 may be connected in a short distance based on a communications network such as Wi-Fi hotspot, Wi-Fi direct connection, Bluetooth, zigbee, or NFC.

Figure 5B:
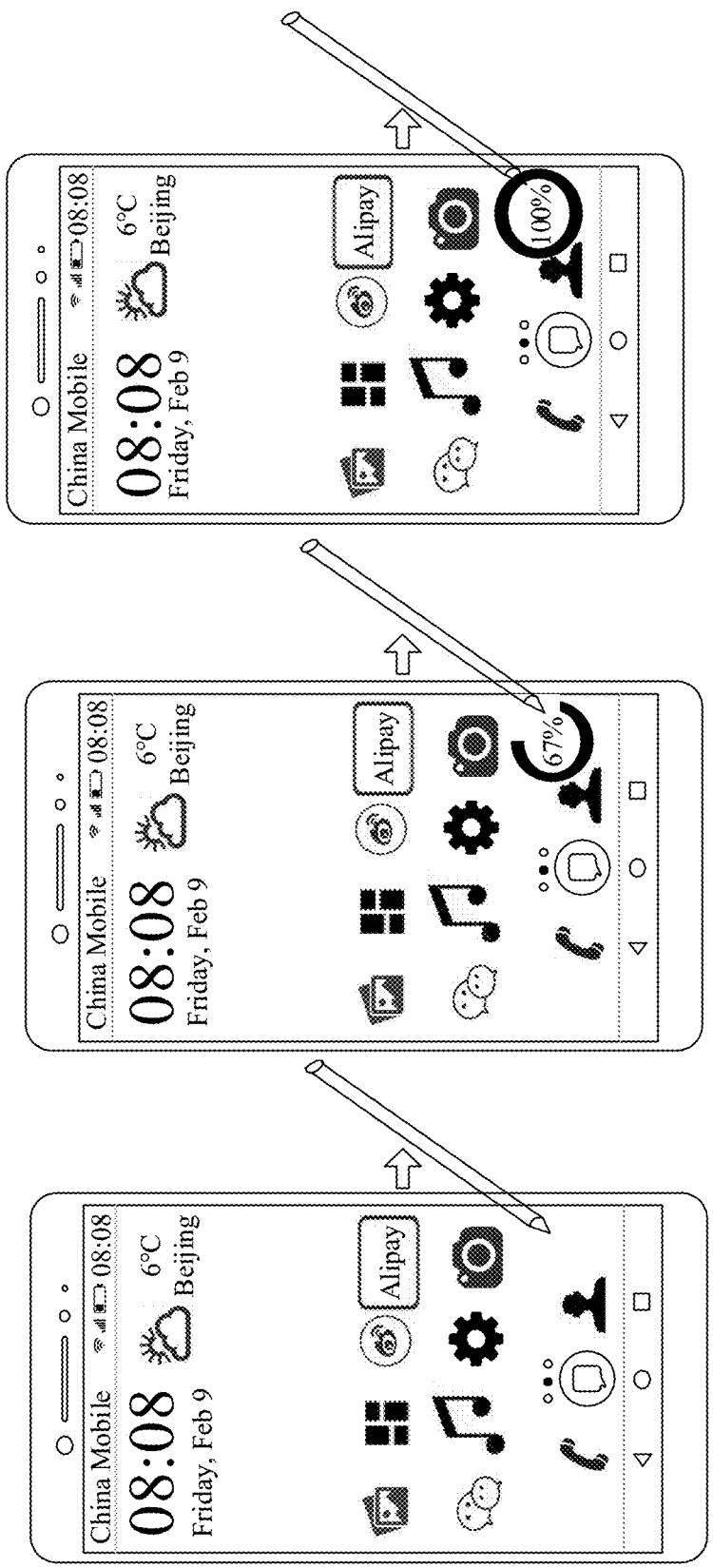
FIG. 5b is a schematic diagram of a screen of network pairing according to an embodiment of this application.

A user may perform manual pairing by turning on a switch of Bluetooth or a hotspot in settings. In this embodiment of this application, if the user holds the active stylus 101 and touches a home screen of the electronic device for a long time, a function of pairing the electronic device 102 with the active stylus 101 may be automatically triggered, and when a progress bar is displayed as 100% on the home screen of the electronic device 102, pairing succeeds. This is shown in FIG. 5b.

502: The active stylus 101 transmits a function signal to the electronic device 102.

Figure 6B:
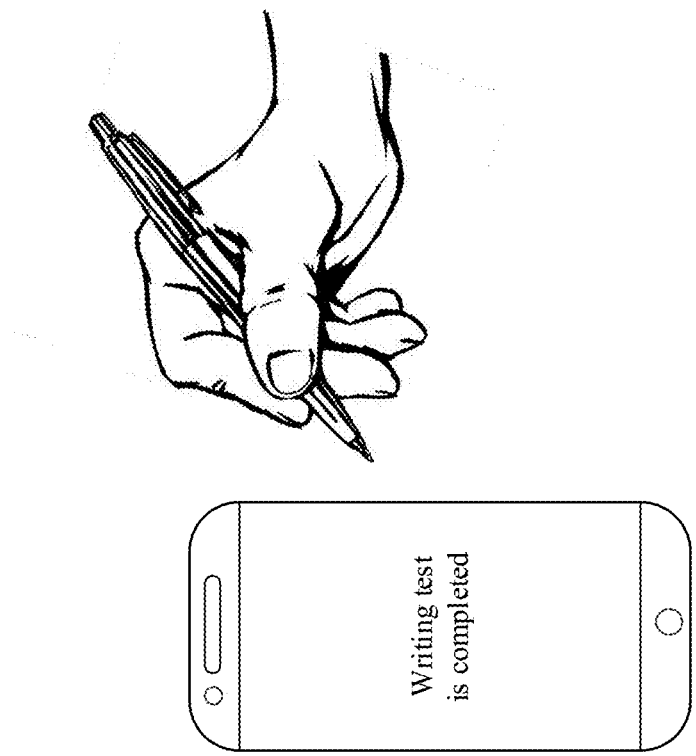
FIG. 6 is a schematic diagram of an active stylus writing manner according to an embodiment of this application.
Figure 6A:
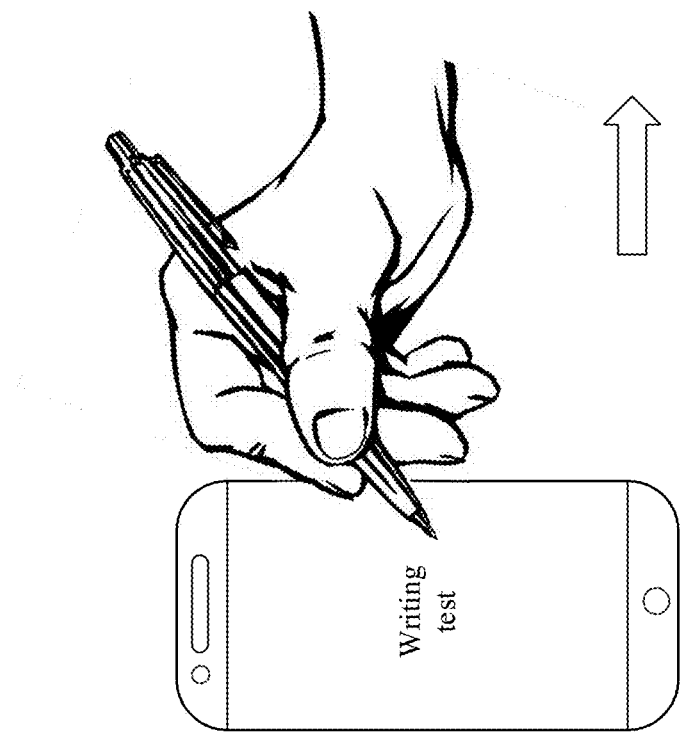

For example, as shown in FIG. 6a and FIG. 6b of FIG. 6, when a user holds the active stylus 10 to write words "writing test" on a touchscreen of a mobile phone, and after the user completes writing "writing test is completed" and a stylus nib leaves the touchscreen, the active stylus 10 transmits a function signal to the touchscreen of the mobile phone. In one case, when the active stylus 101 is an active capacitive stylus, the function signal is a voltage drive signal, and a touchscreen of the electronic device 102 receives the voltage drive signal. When a distance between the electronic device 102 and the active stylus 101 is as that shown in FIG. 6a, the received voltage drive signal is relatively strong, and a capacitance value at a touch point is relatively large. When a distance between the electronic device 102 and the active stylus 101 is as that shown in FIG. 6b, the received voltage drive signal is relatively weak, and a capacitance value at a touch point is relatively small. In another case, when the active stylus 101 is an active electromagnetic stylus, the function signal is an electromagnetic drive signal. The touchscreen of the electronic device 102 receives the electromagnetic drive signal. When a distance between the electronic device 102 and the active stylus 101 is as that shown in FIG. 6a, the received electromagnetic drive signal is relatively strong, and a magnetic flux at a touch point is relatively large. When a distance between the electronic device 102 and the active stylus 101 is as that shown in FIG. 6b, the received electromagnetic drive signal is relatively weak, and a magnetic flux at a touch point is relatively small.

503: The electronic device 102 determines a distance between the active stylus 101 and the touchscreen of the electronic device 102 based on a parameter value, obtained through detection, corresponding to the function signal. If timing is started when the distance is a first threshold, when timing duration reaches specified duration and the distance is a second threshold, a force calibration instruction is sent to the active stylus 101 through a network.

The second threshold is greater than the first threshold. In other words, in this scenario, the distance between the active stylus 101 and the touchscreen of the electronic device 102 gradually increases. It should be noted that, a developer pre-trains and generates a correspondence between different parameter values, detected by the electronic device, corresponding to function signals and distances between the active stylus 101 and the touchscreen. In this way, when detecting different parameter values, the electronic device 102 may correspondingly obtain corresponding distance values.

Figure 7:
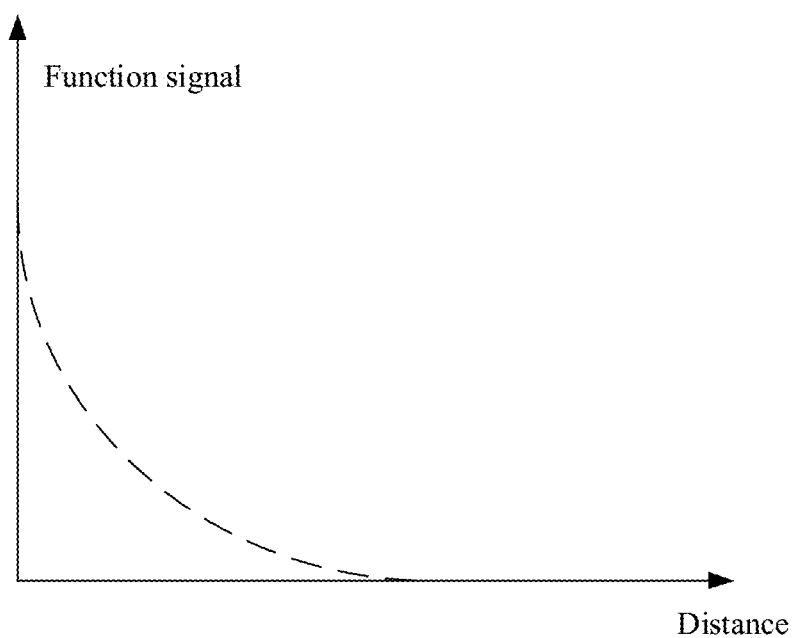
FIG. 7 is a schematic diagram of a relationship between a function signal and a distance according to an embodiment of this application.
Figure 8:
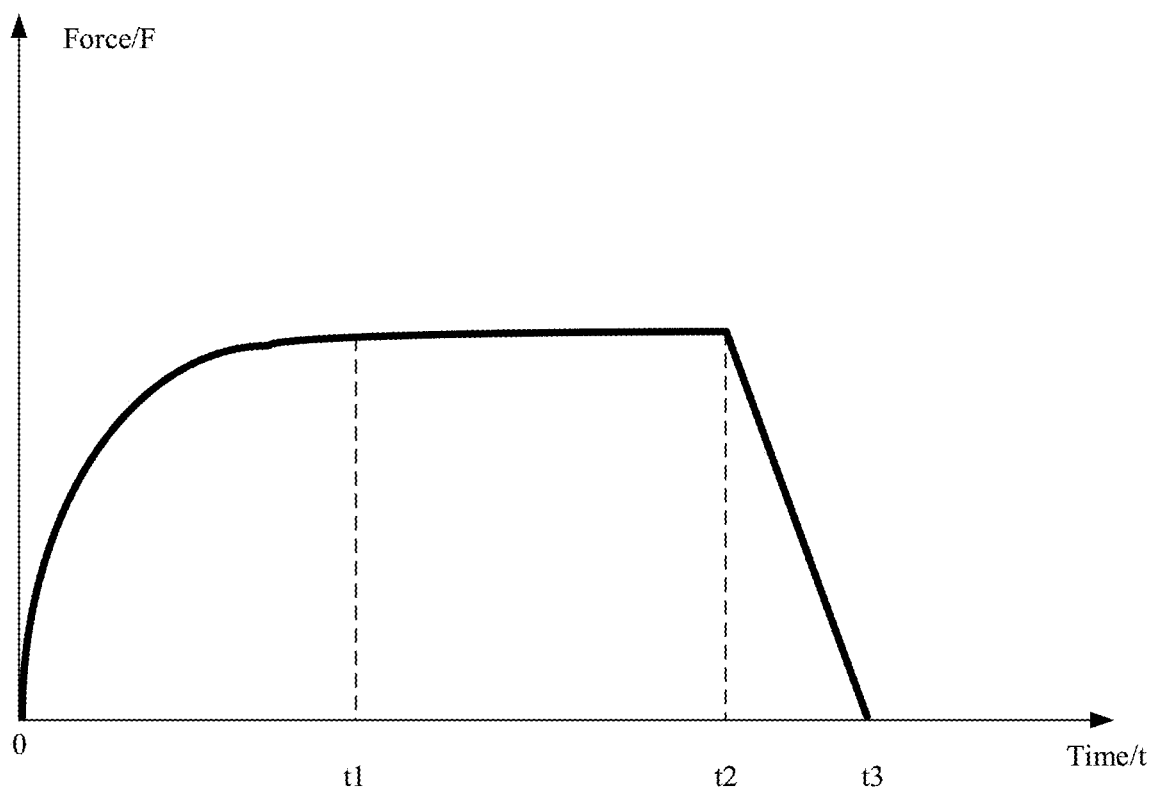
FIG. 8 is a schematic diagram of force deformation restoration according to an embodiment of this application.

For example, as shown in FIG. 6, if the distance between the active stylus 101 and the touchscreen of the electronic device 102 changes from that in FIG. 6a to that in FIG. 6b, a relationship between the parameter value and the distance is shown in FIG. 7. It can be learned that a larger distance indicates a smaller parameter value. Usually, in a period during which the active stylus completes writing and leaves the touch panel, there exists a force deformation restoration period of the force sensor. As shown in FIG. 8, after the stylus completely leaves the screen, there is still a force deformation restoration period (namely, a period from t2 to t3). In the prior art, calibration is performed only when the active stylus 101 detects that force does not change. Therefore, a false report point (commonly referred to as "water leakage") is easily generated on the touch panel in the deformation restoration period.

In this embodiment of this application, when the electronic device 102 detects that the distance increases from zero to the first threshold (where for example, the first threshold is 0.5 millimeter), the electronic device starts timing. When the timing duration reaches the specified duration (where the specified duration is related to deformation restoration duration of the force sensor, for example, 100 milliseconds) and the distance reaches the second threshold (where for example, the first threshold is 2.5 millimeters), the electronic device generates the force calibration instruction at this moment, and sends the force calibration instruction to the active stylus 101.

In other words, the electronic device 102 presets that when the distance between the active stylus 101 and the touchscreen of the electronic device 102 is less than the first threshold, the active stylus 101 may generate a report point on the touchscreen. However, when the distance between the active stylus 101 and the touchscreen of the electronic device 102 increases to the second threshold, and duration counted from the first threshold already reaches the deformation restoration duration of the force sensor, the force calibration instruction is generated, and the force calibration instruction is sent to the active stylus 101.

505: The active stylus 101 calibrates the force sensor.

In other words, the active stylus 101 uses a current force value detected by the force sensor as a reference value.

It can be learned that in this embodiment of this application, a current status of the stylus is determined based on the distance between the active stylus and the touchscreen of the electronic device 102. When the stylus is far away from the screen and the force sensor already completes deformation restoration, the stylus is indicated, by using Bluetooth or another short-distance network, to perform force calibration. Therefore, when the active stylus is used for writing under fixed force, the distance between the active stylus and the touchscreen of the electronic device 102 is always the first threshold, and therefore, miscalibration does not occur. In addition, when writing is finished, in a period from a time when the user starts to lift the stylus to a time when the user completely moves the stylus away from the screen, the electronic device 102 calibrates the active stylus 101 when determining that the distance reaches the second threshold and deformation restoration duration of the force sensor is already exceeded, so that miscalibration does not occur, and due to timely calibration, a false report point (that is, "water leakage") is not generated on the touchscreen in a process of lifting the stylus by the user.

Figure 9:
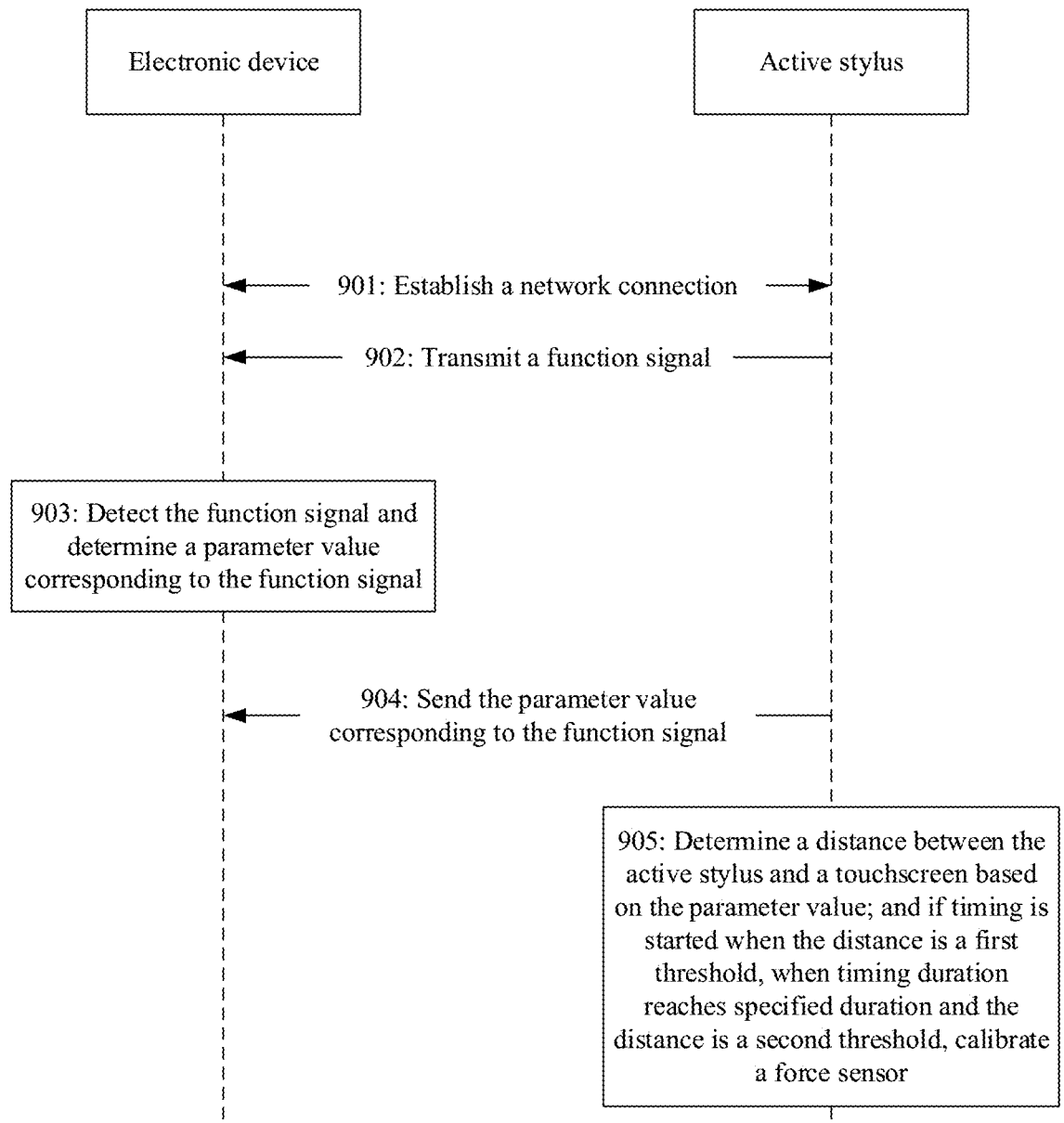
FIG. 9 is a schematic diagram of another active stylus writing manner according to an embodiment of this application.

An embodiment of this application provides another active stylus calibration method. The method can implement calibration of an active stylus 101 based on a distance between the active stylus 101 and an electronic device 102. As shown in FIG. 9, the method includes the following steps.

901: The electronic device 102 establishes a network connection to the active stylus 101.

For example, the electronic device 102 and the active stylus 101 may be connected in a short distance based on a communications network such as Wi-Fi hotspot, Wi-Fi direct connection, Bluetooth, zigbee, or NFC.

902: The active stylus 101 transmits a function signal to the electronic device.

903: The electronic device 102 detects the function signal, and determines a parameter value corresponding to the function signal.

904: The electronic device 102 sends, to the active stylus 101, the parameter value corresponding to the function signal.

905: The active stylus 101 determines a distance between the active stylus and a touchscreen based on the parameter value; and if timing is started when the distance is a first threshold, when timing duration reaches specified duration and the distance is a second threshold, a force sensor is calibrated.

Similarly, the second threshold is greater than the first threshold. In other words, in this scenario, the distance between the active stylus 101 and the touchscreen of the electronic device 102 gradually increases. It should be noted that, a developer pre-trains and generates a correspondence between different parameter values, detected by the electronic device, corresponding to function signals and distances between the active stylus 101 and the touchscreen. In this way, when detecting different parameter values, the electronic device 102 may correspondingly obtain corresponding distance values.

For example, as shown in FIG. 6, if the distance between the active stylus 101 and the touchscreen of the electronic device 102 changes from that in FIG. 6*a* to that in FIG. 6*b*, the electronic device 102 sends, to the active stylus 101, the parameter value, detected in this period, corresponding to the function signal, and then the active stylus 101 determines the distance based on the parameter value. If timing is started when the distance increases from zero to the first threshold (where for example, the first threshold is 0.5 millimeter), when the timing duration reaches the specified duration (where the specified duration is related to deformation restoration duration of the force sensor, for example, 100 milliseconds) and the distance reaches the second threshold (where for example, the first threshold is 2.5 millimeters), the active stylus 101 performs force calibration on the force sensor.

In other words, the electronic device 102 presets that when the distance between the active stylus 101 and the touchscreen of the electronic device 102 is less than the first threshold, the active stylus 101 may generate a report point on the touchscreen. However, when the active stylus 101 determines that the distance between the active stylus 101 and the electronic device 102 increases to the second threshold, and deformation restoration duration is already exceeded, the force sensor is calibrated. Therefore, when the active stylus is under fixed force, the distance between the active stylus and the touchscreen of the electronic device 102 is always the first threshold, and therefore, miscalibration does not occur. In addition, when writing is finished, in a period from a time when a user starts to lift the stylus to a time when the user completely moves the stylus away from the screen, the active stylus 101 calibrates the force sensor when determining that the distance reaches the second threshold and deformation restoration duration of the force sensor is already exceeded, so that miscalibration does not occur, and due to timely calibration, a false report point (that is, "water leakage") is not generated on the touchscreen in a process of lifting the stylus by the user.

Figure 10:
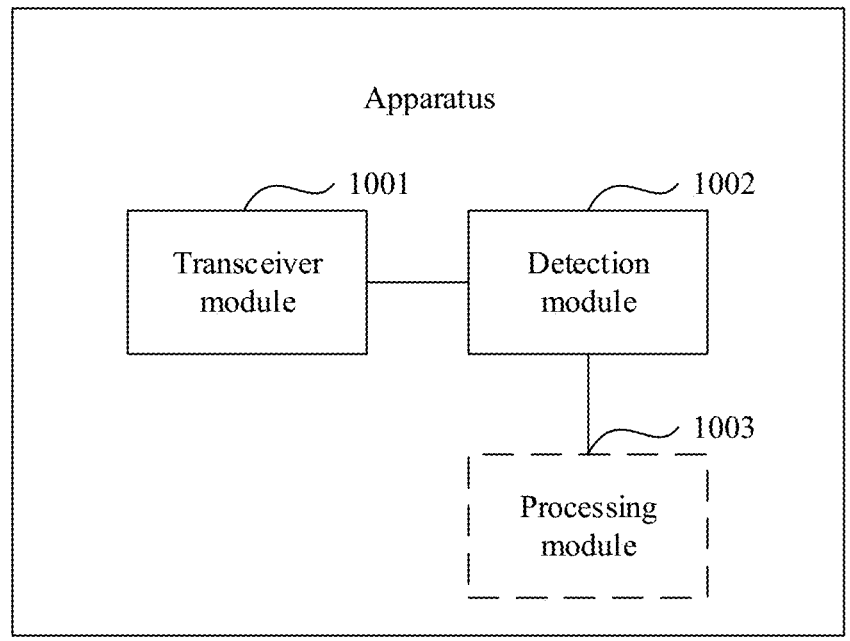
FIG. 10 is a schematic structural diagram of an apparatus according to an embodiment of this application.

An embodiment of this application further provides an active stylus calibration method and apparatus. As shown in FIG. 10, the apparatus includes a transceiver module 1001 and a detection module 1002.

In a possible embodiment, the transceiver module 1001 is configured to establish a network connection to an active stylus, the detection module 1002 is configured to detect a function signal transmitted by the active stylus, and the apparatus further includes a processing module 1003, configured to: determine a distance between the active stylus and a touchscreen based on a parameter value, obtained through detection, corresponding to the function signal. The transceiver module 1001 is further configured to: when timing duration reaches specified duration and the distance is a second threshold, send a force calibration instruction to the active stylus through the network connection. Related content in the method embodiments of FIG. 5*a* to FIG. 8 may be cited in the foregoing function descriptions, and details are not described repeatedly herein.

In another possible embodiment, the transceiver module 1001 is configured to establish a network connection to an active stylus, the detection module 1002 is configured to detect a function signal transmitted by the active stylus, and the transceiver module 1001 is further configured to send, to the active stylus through the network connection, a parameter value, obtained through detection, corresponding to the function signal, so that the active stylus calibrates a force sensor when determining that the parameter value, obtained through detection, corresponding to the function signal meets specified condition. Related content in the method embodiment of FIG. 9 may be cited in the foregoing function descriptions, and details are not described repeatedly herein.

It should be noted that the apparatus has a function of implementing the electronic device in the foregoing method designs. These unit modules may be implemented by hardware in the electronic device, or may be implemented by hardware in the electronic device by executing corresponding software. This is not limited in this embodiment of this application.

It can be learned that this embodiment of this application can be used to resolve a problem of miscalibration of the active stylus and a problem of water leakage caused by untimely calibration.

Figure 11:
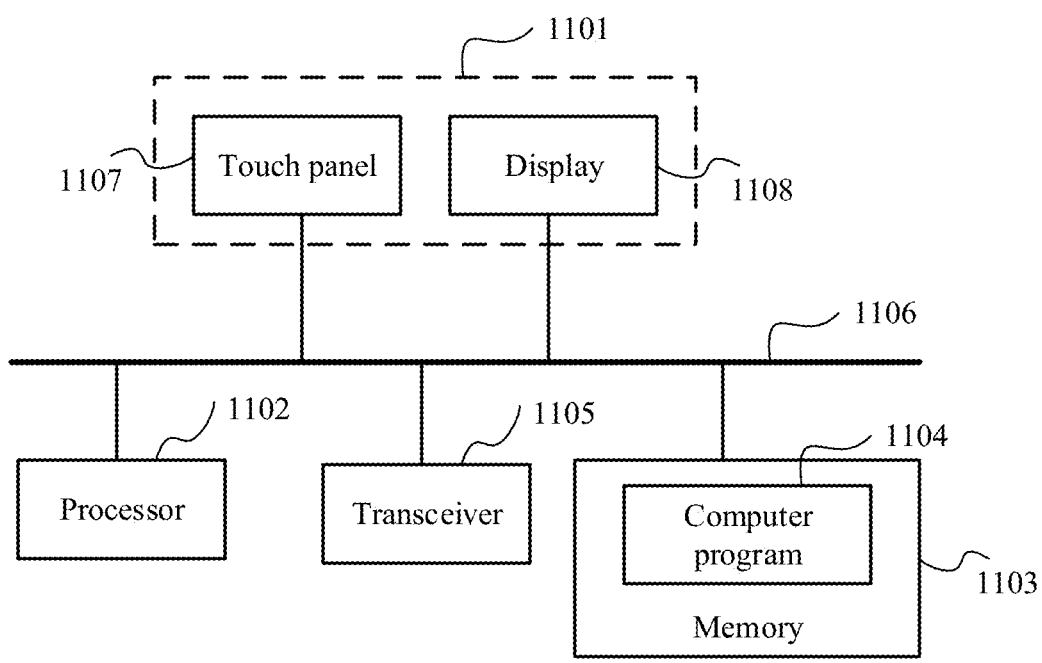
FIG. 11 is a schematic structural diagram of an electronic device according to an embodiment of this application.

In some other embodiments of this application, the embodiments of this application disclose an electronic device. As shown in FIG. 11, the electronic device may include a touchscreen 1101, where the touchscreen 1101 includes a touch panel 1107 and a display 1108; one or more processors 1102; a memory 1103; one or more applications (not shown); one or more computer programs 1104; and a transceiver 1105. The foregoing components may be connected by using one or more communications buses 1106. The one or more computer programs 1104 are stored in the memory 1103 and configured to be executed by the one or more processors 1102. The one or more computer programs 1104 include an instruction, and the instruction may be used to perform steps in the embodiments of FIG. 5*a* to FIG. 9.

Figure 12:
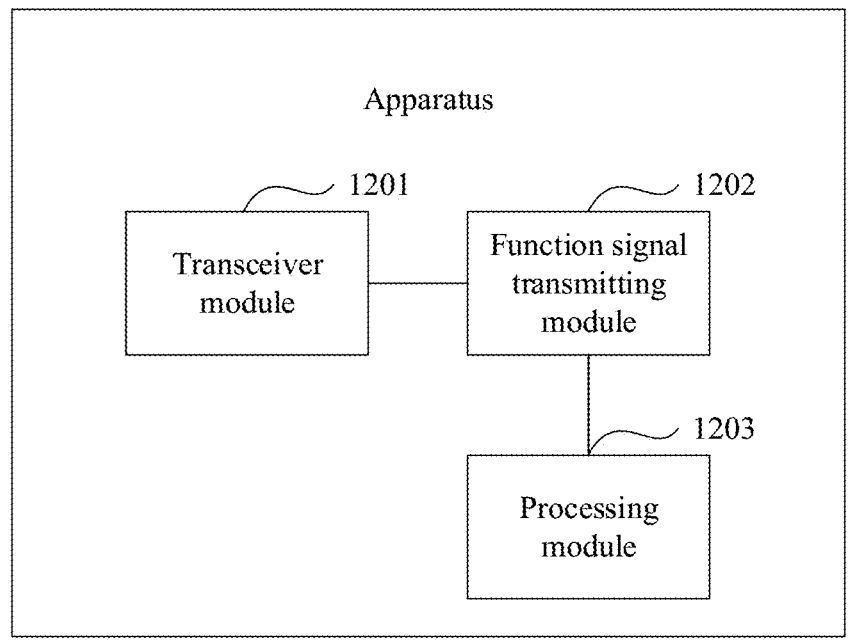
FIG. 12 is a schematic structural diagram of another apparatus according to an embodiment of this application.

An embodiment of this application further provides an active stylus calibration method and apparatus. As shown in FIG. 12, the apparatus includes a transceiver module 1201, a function signal transmitting module 1202, and a processing module 1203.

In a possible embodiment, the transceiver module 1201 is configured to establish a network connection to an electronic device, the function signal transmitting module 1202 is configured to transmit a function signal to a touchscreen of the electronic device, and the transceiver module 1201 is further configured to receive a force calibration instruction sent by the electronic device. The processing module 1203 is configured to calibrate a force sensor. Related content in the method embodiments of FIG. 5*a* to FIG. 8 may be cited in the foregoing function descriptions, and details are not described repeatedly herein.

In another possible embodiment, the transceiver module 1201 is configured to establish a network connection to an electronic device, the function signal transmitting module 1202 is configured to transmit a function signal to a touchscreen of the electronic device, and the transceiver module 1201 is further configured to receive a parameter value, sent by the electronic device, corresponding to the function signal. The processing module 1203 is configured to determine a distance between an active stylus and the touchscreen based on the parameter value, obtained through detection, corresponding to the function signal. When timing duration reaches specified duration and the distance is a second threshold, the force sensor is calibrated. Related content in the method embodiment of FIG. 9 may be cited in the foregoing function descriptions, and details are not described repeatedly herein.

It should be noted that the apparatus has a function of implementing the active stylus in the foregoing method designs. These unit modules may be implemented by hardware in the active stylus, or may be implemented by hardware in the active stylus by executing corresponding software. This is not limited in this embodiment of this application.

It can be learned that this embodiment of this application can be used to resolve a problem of miscalibration of the active stylus and a problem of water leakage caused by untimely calibration.

Figure 13:
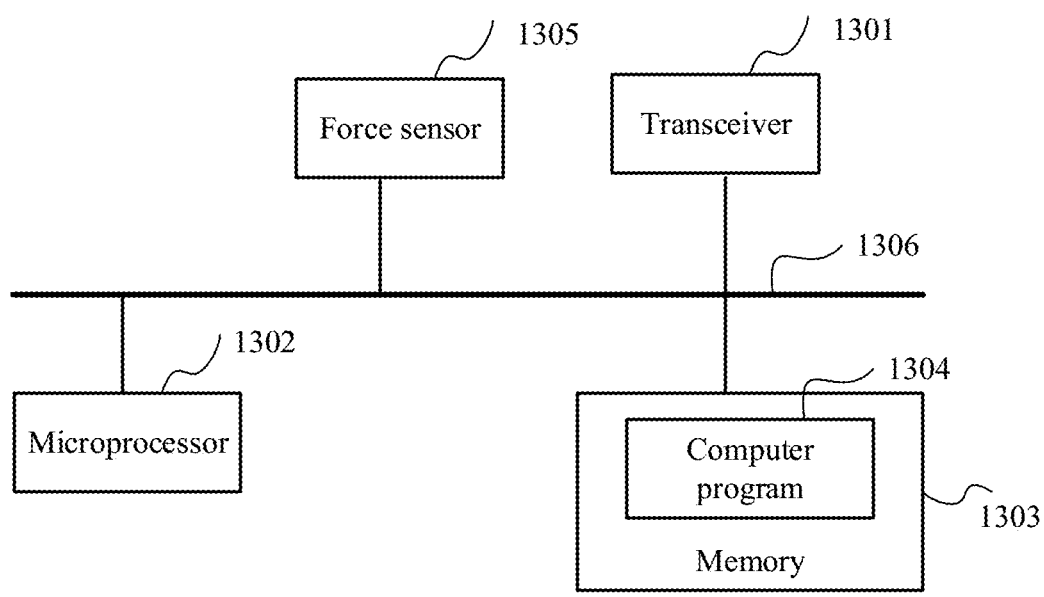
FIG. 13 is a schematic structural diagram of an active stylus according to an embodiment of this application.

In some other embodiments of this application, the embodiments of this application disclose an active stylus. As shown in FIG. 13, the active stylus may include a transceiver 1301, a microprocessor 1302, a memory 1303, one or more computer programs 1304, and a transceiver 1305. The foregoing components may be connected by using one or more communications buses 1306. The one or more computer programs 1304 are stored in the memory 1303 and configured to be executed by the one or more processors 1302. The one or more computer programs 1304 include an instruction, and the instruction may be used to perform steps in the embodiments of FIG. 5a to FIG. 9.

An embodiment of this application further provides a computer-readable storage medium. The computer-readable storage medium stores a computer instruction, and when the computer instruction is run on an electronic device, the electronic device is enabled to perform the foregoing related method steps, to implement the active stylus calibration methods in the foregoing embodiments.

An embodiment of this application further provides a computer-readable storage medium. The computer-readable storage medium stores a computer instruction, and when the computer instruction is run on an active stylus, the active stylus is enabled to perform the foregoing related method steps, to implement the active stylus calibration methods in the foregoing embodiments.

An embodiment of this application further provides a computer program product. When the computer program product is run on a computer, the computer is enabled to perform the foregoing related steps, to implement the active stylus calibration methods in the foregoing embodiments.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the active stylus calibration methods in the foregoing method embodiments.

The electronic device, the computer-readable storage medium, the computer program product, or the chip provided in the embodiments of this application is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. During actual application, the foregoing functions can be allocated to different modules and implemented based on a requirement, in other words, an inner structure of an apparatus is divided into different function modules, to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method to implemented by an active stylus, wherein the method comprises:
    establishing a network connection to an electronic device that comprises a touchscreen;
    transmitting a function signal to the electronic device;
    receiving, from the electronic device through the network connection, a force calibration instruction when a parameter value corresponding to the function signal meets a condition, wherein the condition comprises:
        a timing is started when a distance between the active stylus and the touchscreen meets a first threshold;
        a timing duration reaches a first duration; and the distance meets a second threshold,
wherein the distance is based on the parameter value, wherein the parameter value is inversely proportional to the distance, wherein the second threshold is greater than the first threshold, and wherein the first duration is related to a deformation restoration period of a force sensor of the active stylus; and
calibrating the force sensor based on the force calibration instruction.

2. The method of claim 1, wherein the function signal is a voltage drive signal, and wherein the parameter value is a capacitance value.

3. The method of claim 1, wherein the network is a short-distance network, and wherein the short-distance network is a WI-FI hotspot network.

4. The method of claim 1, wherein the function signal is an electromagnetic drive signal, and wherein the parameter value is a magnetic flux.

5. The method of claim 1, wherein the network is a short-distance network, and wherein the short-distance network is a WI-FI peer-to-peer (P2P) network.

6. The method of claim 1, wherein the network is a short-distance network, and wherein the short-distance network is a BLUETOOTH network.

7. The method of claim 1, wherein the network is a short-distance network, and wherein the short-distance network is a ZIGBEE network.

8. The method of claim 1, wherein the network is a short-distance network, and wherein the short-distance network is a Near-Field Communication (NFC) network.

9. An active stylus comprising:
an active stylus body comprising a core;
a force sensor disposed on the active stylus body;
a memory configured to store one or more computer programs;
a transceiver configured to establish a network connection to an electronic device that comprises a touchscreen; and
a microprocessor coupled to the memory, wherein the one or more computer programs cause the processor to be configured to:
generate a function signal; and
transmit, using the transceiver, the function signal to a touchscreen of the electronic device via the core,
wherein the transceiver is further configured to receive, from the electronic device, a force calibration instruction when a parameter value corresponding to the function signal meets a condition, wherein the condition comprises:
a timing is started when a distance between the active stylus and the touchscreen meets a first threshold;
a timing duration reaches a first duration; and
the distance meets a second threshold,
wherein the distance is based on the parameter value, wherein the parameter value is inversely proportional to the distance, wherein the second threshold is greater than the first threshold, and wherein the first duration is related to a deformation restoration period of the force sensor, and
wherein the microprocessor is further configured to calibrate the force sensor based on the force calibration instruction.

10. The active stylus of claim 9, wherein the function signal is a voltage drive signal, and wherein the parameter value is a capacitance value.

11. The active stylus of claim 9, wherein the function signal is an electromagnetic drive signal, and wherein the parameter value is a magnetic flux.

12. The active stylus of claim 9, wherein the network is a short-distance network, and wherein the short-distance network is a WI-FI hotspot network.

13. The active stylus of claim 9, wherein the network is a short-distance network, and wherein the short-distance network is a WI-FI peer-to-peer (P2P) network.

14. The active stylus of claim 9, wherein the network is a short-distance network, and wherein the short-distance network is a BLUETOOTH network.

15. The active stylus of claim 9, wherein the network is a short-distance network, and wherein the short-distance network is a ZIGBEE network.

16. The active stylus of claim 9, wherein the network is a short-distance network, and wherein the short-distance network is a Near-Field Communication (NFC) network.

17. An active stylus comprising:
an active stylus body comprising a core;
a force sensor disposed on the active stylus body;
a memory configured to store one or more computer programs;
a transceiver configured to establish a network connection to an electronic device that comprises a touchscreen; and
a microprocessor coupled to the memory, wherein the one or more computer programs cause the processor to be configured to:
generate a function signal; and
transmit, using the transceiver, the function signal to a touchscreen of the electronic device using the core,
wherein the transceiver is further configured to receive, from the electronic device, a parameter value corresponding to the function signal,
wherein the microprocessor is further configured to:
determine a distance between the active stylus and the touchscreen based on the parameter value, wherein the parameter value is inversely proportional to the distance;
calibrate the force sensor when the parameter value meets a condition, wherein the condition comprises:
a timing is started when the distance meets a first threshold;
a timing duration reaches a first duration; and
the distance meets a second threshold,
wherein the second threshold is greater than the first threshold, and wherein the first duration is related to a deformation restoration period of the force sensor.

18. The active stylus of claim 17, wherein the function signal is a voltage drive signal, and wherein the parameter value is a capacitance value.

19. The active stylus of claim 17, wherein the function signal is an electromagnetic drive signal, and wherein the parameter value is a magnetic flux.

20. The active stylus of claim 17, wherein the network is a short-distance network, and wherein the short-distance network is one of a WI-FI hotspot network, a WI-FI peer-to-peer (P2P) network, a BLUETOOTH network, a ZIGBEE network, or a Near-Field Communication (NFC) network.

\* \* \* \* \*